United States Patent [19]

McColgin et al.

[11] 3,860,886

[45] Jan. 14, 1975

[54] DYE LASER AND METHOD

[75] Inventors: William C. McColgin; Derek D. Chapman, both of Rochester, N.Y.

[73] Assignee: Eastman Kodak Company, Rochester, N.Y.

[22] Filed: Sept. 4, 1973

[21] Appl. No.: 394,378

[52] U.S. Cl............ 331/94.5 L, 252/301.2, 330/4.3
[51] Int. Cl............................................... H01s 3/20
[58] Field of Search................. 331/94.5; 252/301.2; 330/4.3

[56] References Cited

UNITED STATES PATENTS 3,388,314   6/1968   Gould ............................... 331/94.5
3,521,187   7/1970   Snavely et al. .................. 331/94.5 L

*Primary Examiner*—William L. Sikes
*Attorney, Agent, or Firm*—D. M. DeLeo

[57] ABSTRACT

Cyanine and merocyanine dyes containing a pyrido-[1,2-a]indolo group are useful as the active lasing ingredient in dye lasers.

16 Claims, No Drawings

DYE LASER AND METHOD

BACKGROUND OF INVENTION

1. Field of Invention

This invention relates to lasers and more particularly to the use of a certain class of dyes as lasing media for organic dye lasers.

2. Description of the Prior Art

Many of the materials discovered thus far which are capable of acting as lasing media have been in the solid or gaseous state. Solid lasers typically suffer from such disadvantages as cracking and optical imperfections. It is also known that certain organic dyes in solution can operate as "liquid" or "organic dye" lasers. Of the range of materials useful as lasing media, organic lasing dyes provide certain advantages. A wide range of organic dye lasers is available to provide stimulated emission (lasing) over a broad range of the spectrum. Secondly, organic dye lasers are generally capable of being tuned to emit over a range of wavelengths, this being in contradistinction to the essentially single wavelength capability of lasing emission characterizing gas and solid lasers. Thirdly organic dye lasers provide an economical lasing medium when compared to gas and solid lasers, and they do not suffer from disadvantages such as cracking and optical imperfections that are particularly associated with solid lasers.

The ability to selectively tune organic dye lasers derives from the broad band fluorescence characteristic of the component dye. Such lasers can be "tuned" to emit at wavelengths along substantially the entire fluorescence band of the dye by interposing a dispersive element such as a diffraction grating or a prism.

The operation of a laser is achieved as a result of the phenomenon that excited atoms or molecules can emit a photon or quantum of light, which photon or quantum can itself trigger another excited atom or molecule to emit its photon prematurely. This process is designated stimulated emission.

The excitation of organic lasing dyes can be achieved by subjecting the dye, under controlled conditions such as will be described herein, to a suitable source of energy such as bombarding it with electrons or illuminating it with a high energy source. Conventionally, illumination is utilized for liquid laser materials. Excitation of a liquid laser medium by illumination is generally termed "optical pumping" or merely "pumping." Pumping sources include, for example, sources such as giant pulse lasers, xenon and argon are flash tubes as well as arc discharge tubes containing only air or other gaseous mixtures.

Various arrangements of laser apparatus can be used. A laser structure particularly adapted for organic dye liquid laser media is described by Sorokin et al., IBM Journal, V. 11, p. 148 (1967). Advantageous laser apparatus structures usually include an optically resonant cavity containing a reservoir of a liquid laser medium or a liquid laser body disposed within a thin-walled quartz cylinder. Typically, the reservoir is part of a closed system through which the dye solution is circulated during lasing operation. Thus, localized heating which can cause refractive discontinuities and potential breakdown of the dye is effectively prevented. To provide an energy source for exciting the atoms of the laser material, the laser body can be surrounded concentrically by a lamp, such as one containing an annular region within an outer thick-walled quartz cylinder. The annular region can contain an air-argon mixture and have electrodes which are operably connected to a low inductance capacitor charged by a standard high voltage supply. Desirably, coaxially disposed at either end of the optically resonant cavity are opposed internally reflective cavity ends such as mirrors.

When optical pumping is used, the light source emits light having wavelengths within at least one absorption band of the lasing medium. The absorbed light causes molecular electrons in the medium to shift in energy level. Molecular electrons exist either in a singlet state (two electrons spinning in opposite directions) or a triplet state (two electrons spinning in the same direction). The ground state is the unexcited state for molecular electrons and has the lowest energy. Typically, the ground state in almost all molecules is a singlet (designated $S^0$), one of many possible energy levels in the singlet state. When the pumping source is activated, the resultant light pulse enters the laser body and photons of energy of appropriate absorptive wavelength are absorbed by active molecules in the body and cause the electrons of such molecules to shift from an initial low energy level ($S^0$) to a high energy level from which emissive transition occurs.

In operation, the molecular electrons of the laser medium are desirably "pumped" to higher excited states of the singlet system by intense energy inputs. It is thought that they then first undergo transitions from such excited states to the lowest excited state (designated $S^1$). After diminishing in energy level to the lowest excited singlet, the molecule can relinquish its remaining excess energy radiatively or nonradiatively from $S^1$ to $S^0$, non-radiatively from $S^1$ to a triplet state and then radiatively or non-radiatively from the lowest excited triplet state to $S^0$. Generally, laser emission consists of optical emission resulting from transitions from $S^1$ to various vibrational modes of $S^0$. Susceptibility to triplet formation upon pumping is deleterious due to typical non-radiative energy losses resulting from triplet to $S^0$ transitions. Also, if there is significant overlap between the triplet absorption and either the pump bands or lasing emission bands, laser action generally will be impeded or will fail entirely. Additionally, advantageous laser emission can occur only when the population of molecules established at this higher energy level in the laser body by such light pumping exceeds the population of molecules remaining at the initial low energy level, a condition conventionally designated "population inversion" or "inversion of energy states."

Upon reaching an inversion of energy states, individual molecules of the high energy level population undergo emissive transition spontaneously, shifting to a terminal low energy level as described herein with a concomitant emission of light. By a means optically coupled with the lasing medium, a portion of the spontaneously emitted light is usually reflected back and forth through a resonant optical cavity structure, such as previously described, between its internally reflective ends. As this light passes through the laser body in multiple bidirectional reflections, it induces other molecules of the enlarged high energy level population to undergo premature light emissive transitions as noted herein. This stimulates the emission of more light, which augments the bidirectionally reflected light in the cavity to induce still further light emissive transitions. A rising pulse of bidirectionally reflected light quickly develops in the cavity, reaching a quantitatively large value as the induced emissive transition of molecules from the high energy level population increases. If one of the reflective cavity ends is partially transmissive, as is typically the case, a portion of the intense reflected light pulse passes through the one and out of the cavity to constitute the laser output light pulse or the laser beam.

Organic dye lasers have several advantages over solid and gas lasers. However, depending upon the wavelength of laser emission desired, one typically must choose entirely different classes of dyes to obtain lasing in different regions of the spectrum. For example, coumarin dyes such as unbelliferone are useful in the short wavelength region, fluorescein is useful in the medium wavelength region and rhodamines such as rhodamine 6G are useful in the longer wavelength region of the visible spectrum.

From a dye synthesis standpoint, it can be readily appreciated that it is usually less expensive to manufacture various members of a given class of dyes than to manufacture several distinct classes of dyes in order to obtain the desired wavelengths of lasing. Accordingly, there is a need in the art for a class of dyes which, by minor alterations thereof, can be made to lase in various portions of the spectrum.

SUMMARY OF THE INVENTION

We have found a class of cyanine and merocyanine dyes containing a pyrido[1,2-a]indolo group are useful as lasing media. This class of dyes includes various individual dyes which lase in different wavelength regions. Thus, minor modifications of the basic class of dyes allows one to form dye lasers which will emit at a variety of wavelengths.

DESCRIPTION OF PREFERRED EMBODIMENTS

The objects of the present invention are obtained through the use of certain dyes in a dye laser having (1) a reservoir means containing a solution of the dye, (2) a pumping energy source operably coupled with the solution for producing a population inversion therein and (3) means optically coupled with the solution for further stimulating emission therefrom during the population inversion. The dye solution comprises a noninterfering solid or liquid host solvent and a lasing concentration of a cyanine or merocyanine dye containing a pyrido[1,2-a]indolo group.

The dyes useful in this invention can be represented by the structural formulas:

I.

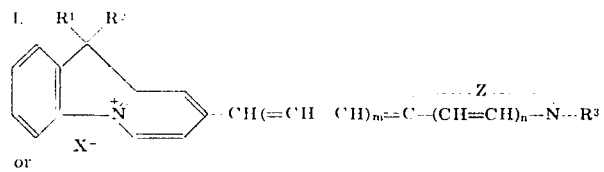

or

II.

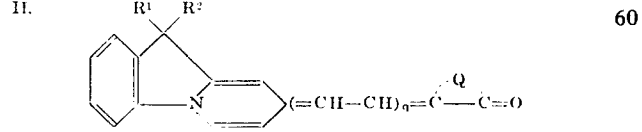

wherein:

$R^1$ and $R^2$ each represent an alkyl group having one to about six carbon atoms such as methyl, ethyl, isopropyl, butyl, etc, or together represent the atoms necessary to complete a cycloalkyl group having about five diethylbenzimidazole, 1-ethyl-3-phenylbenzimidazole, etc), a naphthimidazole nucleus (e.g., 1H-naphth[2,3-d]imidazole, etc), a 3,3-dialkylindolenine nucleus (e.g., 3,3-dimethylindolenine, 3,3,5-trimethylindolenine, 3,3,7-trimethylindolenine, etc), a 2-pyridine nucleus (e.g., pyridine, 5-methylpyridine, etc), a 4-pyridine nucleus (e.g., pyridine, etc), an imidazo-[4,5-b]quinoxaline nucleus (e.g., 1,3-dialkylimidazo[4,5-b]-quinoxaline such as 1,3-diethylimidazo[4,5-b]quinoxaline, 6-chloro-1,3-diethylimidazo[4,5-b]quinoxaline, etc, 1,3-dialkenylimidazo[4,5-b]quinoxaline such as 1,3-diallylimidazo[4,5-b]-quinoxaline, 6-chloro-1,3-diallylimidazo[4,5-b]quinoxaline, etc, 1,3-diarylimidazo[4,5-b]quinoxaline such as 6,7-dichloro-1,3-diphenylimidazo[4,5-b]quinoxaline, 1,3-diphenylimidazo[4,5-b]-quinoxaline, 6-chloro-1,3-diphenylimidazo[4,5-b]quinoxaline, 1,3-bis(p-chlorophenyl)imidazo[4,5-b]quinoxaline), etc;

$X^-$ represents an acid anion such as chloride, bromide, iodide, thiocyanate, perchlorate, p-toluenesulfonate, tetrafluoroborate, etc.

Q represents the non-metallic atoms necessary to complete a five- or six-membered ring of the type used in merocyanine dyes and typically contains at least one hetero atom selected from nitrogen, oxygen, or sulfur. Exemplary hetero-cyclic nuclei of the type used in merocyanine dyes include an isoxazolinone nucleus (e.g., 3-phenyl-2-isoxazolin-5-one, 3-methyl-2-isoxazolin-5-one, etc), an oxindole nucleus (e.g., 1-alkyl-2,3-dihydro-2-oxindoles, etc), a 2,4,6-triketohexahydropyrimidine nucleus (e.g., barbituric acid or 2-thiobarbituric acid, as well as their 1-alkyl (e.g., 1-methyl,1-ethyl, 1-n-propyl, 1-n-heptyl, etc), or 1,3-dialkyl (e.g., 1,3-dimethyl, 1,3-diethyl, 1,3-di-n-propyl, 1,3-diisopropyl, 1,3-dicyclohexyl, 1,3-di(2-methoxyethyl), 1,3-di(dialkylaminoalkyl), 1-alkyl-3-(2-morpholinoalkyl), etc), or 1,3-diaryl (e.g., 1,3-diphenyl, 1,3-di(4-chlorophenyl), 1,3-di-(4-ethoxycarbonylphenyl), 1,3-di-(dialkylaminophenyl), etc), or 1-aryl (e.g., 1-phenyl, 1-p-chlorophenyl, 1-p-ethoxycarbonylphenyl, etc), or 1-alkyl-3-aryl (e.g., 1-ethyl-3-phenyl, 1-heptyl-3-phenyl, etc) derivatives, a 2(3H)-imidazo[1,2-a]pyridone nucleus; a 5,7-dioxo-6,7-dihydro-5-thiazolo[3,2-a]pyrimidine nucleus (e.g., 5,7-dioxo-3-phenyl-6,7-dihydro-5-thiazolo[3,2-a]pyrimidine nucleus), a 2-thio-2,4-oxazolidinedione nucleus (e.g., a 2-thio-2,4-(3H, 5H)-oxazoledione nucleus) (e.g., 3-ethyl-2-thio-2,4-oxazolidinedione, etc), a thianaphthenone nucleus (e.g., 3(2H)-thianaphthenone, 3(2H)-thianaphthenone-1,1-dioxide, etc), a 2-thio-2,5-thiazolidinedione nucleus (i.e., a 2-thio-2,5-(3H,4H)-thiazoledione nucleus) (e.g., 3-ethyl-2-thio-2,5-(3H,4H)-thiazolidinedione, etc), a 2,4-thiazolidinedione nucleus (e.g., 2,4-thiazolidinedione, 3-ethyl-2,4-thiazolidinedione, 3-phenyl-2,4-thiazolidinedione, 3-α-naphthyl-2,4-thiazolidinedione, etc), a thiazolidinone nucleus (e.g., 4-thiazolidinone, 3-ethyl-4-thiazolidinone, 3-phenyl-4-thiazolidinone, 3-α-naphthyl-4-thiazolidinone, etc), a 4-thiazolinone nucleus (e.g., 2-ethylmercapto-5-thiazolin-4-one, 2-alkylphenylamino-5-thiazolin-4-ones, 2-diphenylamino-5-thiazolinone-4-one, etc), a 2-imino-2-oxazolin-4-one (i.e., pseudohydantoin) nucleus, a 2,4-imidazolidinedione (hydantoin) nucleus (e.g., 2,4-imidazolidinedione, 3-ethyl-2,4-imidazolidine-dione, 3-phenyl-2,4-imidazolidinedione, 3-α-naphthyl-2,4-imidazolidinedione, 1,3-diethyl-2,4-imidazolidinedione, 1ethyl-3-α-naphthyl-2,4-imidazolidinedione, 1,3-diphenyl-2,4-imidazolidinedione, etc), a dione nucleus (e.g., 1,3-dioxane-4,6-dione), a tetrone nucleus (e.g., 2H-pyran-2,4,5,7-(1H,3H,6H)tetrone), etc, a 2-imidazolin-5-one nucleus (e.g., (2-n-propylmercapto-2-imidazolin-5-one), etc), etc. Exemplary carbocyclic nuclei of the type used in merocyanine dyes include a dione nucleus (e.g., 1,3-cyclohexanedione), a tetrone nucleus (e.g., 1,2,4,5-cyclohexanetetrone), a 1,3-indanedione nucleus, etc. Especially useful are nuclei wherein Q represents the non-metallic atoms necessary to complete a five- or six-membered heterocyclic ring having two hetero atoms at least one of which is nitrogen and the other is selected from nitrogen, oxygen or sulfur.

The cyanine dyes of structural formula I above are typically prepared by reacting (1) a compound of the formula:

III. 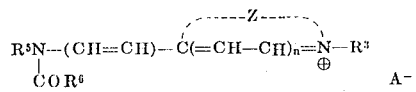

wherein $R^3$, $n$ and Z are as defined above, $A^-$ is an anion as described above for $X^-$, $R^5$ represents a monocyclic aryl group of six or seven carbon atoms, e.g., phenyl, p-tolyl, etc, and $R^6$ represents an alkyl group of from one to 12 carbon atoms with (2) an appropriately substituted intermediate having the formula:

IV. 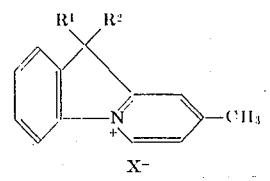

wherein $R^1$, $R^2$ and $X^-$ all are as described above.

The merocyanine dyes of Formula II are typically prepared by heating a mixture of (1) a compound of the formula:

V. 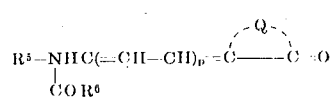

wherein $p$ is an integer having a value of 0 or 1 and $R^5$, $R^6$, and Q are as described above with (2) a compound of the formula IV above.

The preparation of dyes of the present invention is described in further detail in copending Heseltine et al. U.S. application Ser. No. 356,980, filed May 3, 1973, and entitled PHOTOGRAPHIC SENSITIZING DYES. The dye intermediates of formula IV above can be prepared by reacting a 2-substituted 3,3-dimethyl-3H-indolium salt with an unsaturated ketone. The preparation of intermediates of this type is described further in copending Chapman U.S. application Ser. No. 305,762, filed Nov. 13, 1972, and entitled NOVEL DYE INTERMEDIATES.

As used herein, the term "lasing concentration" refers to a concentration sufficient to promote, under appropriate conditions such as those mentioned herein, stimulated emission of the laser dye solution. Generally, concentrations of from about $10^{-1}$ to $10^{-6}$ molar are employed, with solutions of from about $10^{-2}$ to $10^{-5}$ molar concentrations being preferred for maximum output energies. Still wider variations in concentration can be used for particular operations, if desired.

Representative useful non-interfering solvents which do not inhibit stimulated emission are water; alkanols, including mono-, di- and polyhydric alcohols containing from one to about six carbon atoms and preferably from two to about four carbon atoms, e.g., methanol, ethanol, isopropanol, isopropanediol, butanol, etc; and aryl alcohols such as various benzene derivatives wherein the hydroxy radical is attached directly to the aryl nucleus or is attached thereto through an alkylene moiety having from one to about four carbon atoms, e.g., phenol, methylphenol, resorcinol, phenylcarbinol, methylphenylcarbinol, etc. Other solvents include heterocyclic compounds having a nitrogen heteroatom (e.g., pyridine, 2,6-dimethylpyridine, etc), lower alkyl ketones such as dimethylketone, and fluorinated organic alcohols corresponding to the alcohols described above and discussed further in Drexhage U.S. Pat. No. 3,736,524. Additional useful solvents include alkyl substituted solvents such as dimethylsulfoxide, dimethylacetamide, dimethylformamide and the like as well as deuterated counterparts of various solvents such as those described above. Of course, combinations of liquids can be used as can other solvents known to be useful in the dye laser art. For example, solid host solvents can be used to form solid solutions of the dye. Acrylic or methacrylic polymers such as polymethylmethacrylate are useful for this purpose. Gelatin is another useful vehicle for lasing dyes. See O. J. Peterson and B. B. Snavely, App. Phys. Let., Vol. 12, p. 238, 1968; B. H. Soffer and B. B. McFarland, App. Phys. Let., Vol. 12, 1967; H. Kogelnick et al, App. Phys. Let., Vol. 16, p. 499, 1970.

The present lasing media can be used in a variety of laser apparatus. A laser structure particularly adapted for testing organic dye liquid laser media is that described by Sorokin et al, IBM Journal (supra). For continuous operation, the present lasing media can be used in apparatus of the type described in copending application of S. A. Tuccio and O. G. Peterson, Ser. No. 117,595, filed Feb. 22, 1971, and entitled CW ORGANIC DYE LASER.

The following examples are included for a further understanding of the invention. Unless otherwise stated, the excitation or pumping energy source in the following examples is a giant pulse from a 530.0 nm. frequency doubled, neodymium glass laser. The dye lasing medium is placed in a cuvette which is located between two dielectric mirrors which are optically coupled with the lasing medium and form a nearly hemispherical dye laser cavity. The light from the excitation or pumping source passes through one of the dielectric mirrors into the dye-containing cuvette and along the optical axis of the cavity. A beam splitter is used to sample the output from the excitation source in order to determine the wavelength of lasing.

EXAMPLE 1

The dye 3'-ethyl-10,10-dimethyl-8-pyrido[1,2-a]indolothiacarbocyanine perchlorate is mixed in pyridine to an optical density of about 2.0 in a 5 cm dye cuvette. The cuvette is placed between the two dielectric mirrors which form a dye laser cavity. The dye is optically excited by a giant pulse from the neodymium glass laser referred to above. The dye is found to lase at a wavelength of about 660 nm. When the dye is dissolved in methanol, it lases at about 666 nm.

EXAMPLE 2

Example 1 is repeated except that the dye used is 3-ethyl-10',10'-dimethyloxa-8-pyrido[1,2-a]indolocarbocyanine perchlorate. With pyridine as the solvent, the dye lases at about 618 nm.

EXAMPLE 3

Example 1 is repeated except that the dye used is 1,3,3,10',10'-pentamethylindo-6'-pyrido[1,2-a]indolocarbocyanine perchlorate. Using pyridine as the solvent, the dye lases at about 638 nm.

EXAMPLE 4

Example 1 is repeated except that the dye used is 1,3-diethyl-5-[8,10-dihydro-10,10-dimethylpyrido[1,2-a]indol-8-ylidene ethylidene]-2-thiobarbituric acid. Using methanol as the solvent, the dye lases at about 572 nm. When pyridine is used as the solvent, the dye lases at about 588 nm.

EXAMPLE 5

Example 1 is repeated that the dye used is 1,3-diethyl-5-[8,10-dihydro-10,10-dimethylpyrido[1,2-a]indol-8-ylidene]barbituric acid. With methanol as the solvent, the dye lases at about 570 nm.

The invention has been described in detail with particular reference to certain preferred embodiments thereof, but it will be understood that variations and modifications can be effected within the spirit and scope of the invention. We claim:

1. A dye laser comprising means containing a laser dye solution and a pumping energy source operably coupled therewith for producing a population inversion in said solution and means optically coupled with said solution for stimulating emission therefrom during said population inversion, said solution comprising a lasing concentration of a lasing dye in a non-interfering solvent, said dye having a formula as follows:

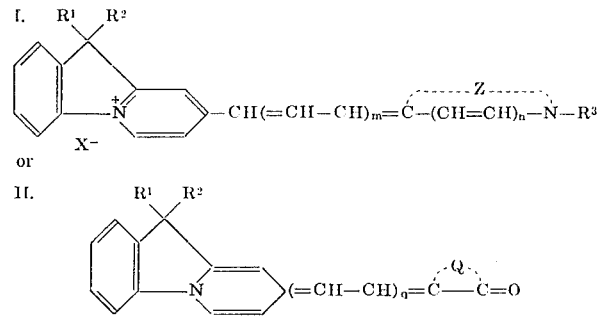

wherein:
  $R^1$ and $R^2$ each represent an alkyl group or together represent the atoms necessary to complete a cycloalkyl group;
  $m$ and $n$ each represent an integer having a value of 0 or 1;
  $q$ represents an integer having a value of 1 or 2;
  $R^3$ represents an alkyl group, an alkenyl group and an aryl group;
  Z represents the non-metallic atoms necessary to complete a heterocyclic nucleus containing five or six atoms in the heterocyclic ring;
  $X^-$ represents an anion; and Q represents the non-metallic atoms necessary to complete a five- or six-membered cyclic ring of the type used in merocyanine dyes.

2. The invention as described in claim 1 wherein said dye is present in a concentration of about $10^{-1}$ to $10^{-6}$ molar.

3. A dye laser comprising means containing a laser dye solution and a pumping energy source operably coupled therewith for producing a population inversion in said solution and means optically coupled with said solution for stimulating emission therefrom during said population inversion, said solution comprising a lasing concentration of a lasing dye in a non-interfering solvent, said dye having a formula as follows:

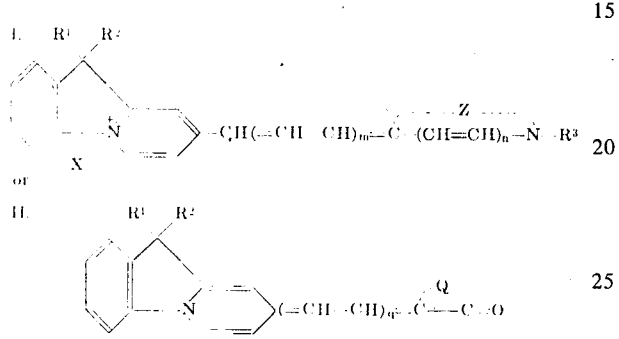

wherein:

R¹ and R² each represent an alkyl group or together represent the atoms necessary to complete a cycloalkyl group;

q represents an integer having a value of 1 or 2;

m and n each represent an integer having a value of 0 or 1;

R³ represents an alkyl group, an alkenyl group and an aryl group;

Z represents the non-metallic atoms necessary to complete a heterocyclic nucleus selected from the group consisting of a thiazole nucleus, a benzothiazole nucleus, a naphthathiazole nucleus, an oxazole nucleus, a benzoxazole nucleus, a naphthoxazole nucleus, a thiazoline nucleus, an imidazoquinoline nucleus, a benz[e]indole nucleus, a benzimidazole nucleus, a naphthimidazole nucleus, a 3,3-dialkylindolenine nucleus, a 2-pyridine nucleus, a 4-pyridine nucleus and an imidazo[4,5-b]quinoxaline nucleus;

X⁻ represents an anion; and

Q represents the non-metallic atoms necessary to complete a five- or six-membered heterocyclic ring having two hetero atoms at least one of which is nitrogen and the other is selected from nitrogen, oxygen, or sulfur.

4. A dye laser comprising means containing a laser dye solution and a pumping energy source operably coupled therewith for producing a population inversion in said solution and means optically coupled with said solution for stimulating emission therefrom during said population inversion, said solution comprising a lasing concentration of a lasing dye in a non-interfering solvent, said dye having a formula as follows:

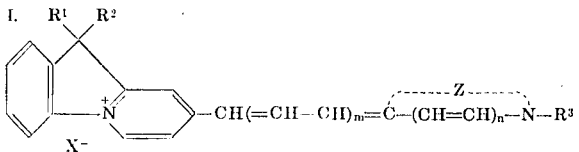

wherein:

R¹ and R² each represent an alkyl group having one to about six carbon atoms or together represent the atoms necessary to complete a cycloalkyl group having about five to 10 carbon atoms;

m and n each represent an integer having a value of 0 or 1;

R³ represents an alkyl group having one to about 10 carbon atoms, an alkenyl group having two to about 10 carbon atoms and a monocyclic, carbocyclic aryl group;

Z represents the non-metallic atoms necessary to complete a heterocyclic nucleus selected from the group consisting of a thiazole nucleus, a benzothiazole nucleus, a naphthathiazole nucleus, an oxazole nucleus, a benzoxazole nucleus, a naphthoxazole nucleus, a thiazoline nucleus, an imidazoquinoline nucleus, a benz[e]indole nucleus, a benzimidazole nucleus, a 3,3-dialkylindolenine nucleus, a 2-pyridine nucleus, a 4-pyridine nucleus and an imidazo[4,5-b]quinoxaline nucleus; and X⁻ represents an anion.

5. A dye laser comprising means containing a laser dye solution and a pumping energy source operably coupled therewith for producing a population inversion in said solution and means optically coupled with said solution for stimulating emission therefrom during said population inversion, said solution comprising a lasing concentration of a lasing dye in a noninterfering solvent, said dye having a formula as follows:

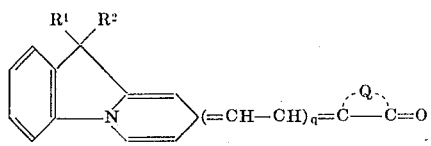

wherein:

R¹ and R² each represent an alkyl group having one to about six carbon atoms or togerher represent the atoms necessary to complete a cycloalkyl group having about five to 10 carbon atoms;

q represents an integer having a value of 1 or 2;

Q represents the non-metallic atoms necessary to complete a five- or six-membered cyclic nucleus selected from the group consisting of an isoxazolinone, an oxindole, a 2,4,6-triketohexahydropyrimidine, a 2(3H)-imidazo[1,2-a]pyridone, a 5,7-dioxo-6,7-dihydro-5-thiazolo[3,2-a]pyrimidine, a 2-thio-2,4-oxazolidinedione, a thianaphthenone, a 2-thio-2,5-thiazolidinedione, a 2,4-thiazolidinedione, a thiazolidinone, a 4-thiazolinone, a 2-imino-2-oxazolin-4-one, a 2,4-imidazolidinedione, a 1,3-indanedione, a dione, a tetrone and a 2-imidazolin-5-one nucleus.

6. A method of producing coherent laser emission in the operation of a dye laser in the wavelength range of from about 500 to about 900 nm comprising the step of optically pumping a dye solution to produce a population inversion in said solution and stimulate emission of radiation therefrom, said solution containing between about $10^{-1}$ to about $10^{-6}$ molar concentration of a lasing dye in a non-interfering solvent, said dye having the formula as follow;

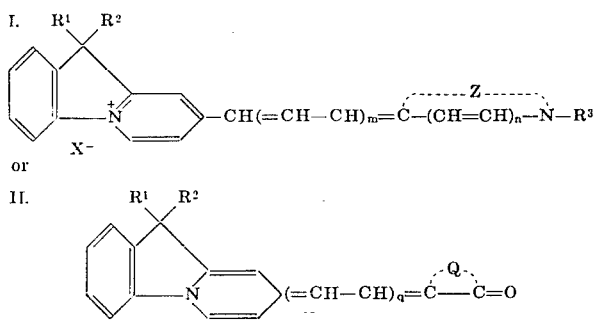

wherein:

R¹ and R² each represent an alkyl group or together represent the atoms necessary to complete a cycloalkyl group;

m and n each represent an integer having a value of 0 or 1;

q represents an integer having a value of 1 or 2;

R³ represents an alkyl group, an alkenyl group and an aryl group;

Z represents the non-metallic atoms necessary to complete a heterocyclic nucleus containing five or six atoms in the heterocyclic ring;

X⁻ represents an anion; and

Q represents the non-metallic atoms necessary to complete a five- or six-membered cyclic ring of the type used in merocyanine dyes.

7. A method of producing coherent laser emission in the operation of a dye laser in the wavelength range of from about 500 to about 900 nm comprising the step of optically pumping a dye solution to produce a population inversion in said solution and stimulate emission of radiation therefrom, said solution containing between about $10^{116\ 2}$ to about $10^{-5}$ molar concentration of a lasing dye in a non-interfering solvent, said dye having the formula as follows:

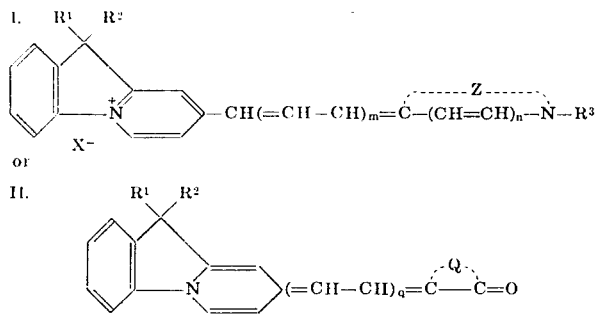

wherein:

R¹ and R² each represent an alkyl group or together represent the atoms necessary to complete a cycloalkyl group;

m and n each represent an integer having a value of 0 or 1;

q represents an integer having a value of 1 and 2;

R³ represents an alkyl group, an alkenyl group and an aryl group;

Z represents the non-metallic atoms necessary to complete a heterocyclic nucleus selected from the group consisting of a thiazole nucleus, a benzothiazole nucleus, a naphthathiazole nucleus, an oxazole nucleus, a benzoxazole nucleus, a naphthoxazole nucleus, a thiazoline nucleus, an imidazoquinoline nucleus, a benz[e]indole nucleus, a benzimidazole nucleus, a naphthimidazole nucleus, a 3,3-dialkylindolenine nucleus, a 2-pyridine nucleus, a 4-pyridine nucleus and an imidazo[4,5-b]quinoxaline nucleus;

X⁻ represents an anion; and

Q represents the non-metallic atoms necessary to complete a five- or six-membered heterocyclic ring having two hetero atoms at least one of which is nitrogen and the other is selected from nitrogen, oxygen, or sulfur.

8. A method of producing coherent laser emission in the operation of a dye laser in the wavelength range of from about 500 to about 900 nm comprising the step of optically pumping a dye solution to produce a population inversion in said solution and stimulate emission of radiation therefrom, said solution containing between about $10^{-2}$ to about $10^{-5}$ molar concentration of a lasing dye in a non-interfering solvent, said dye having the formula as follows:

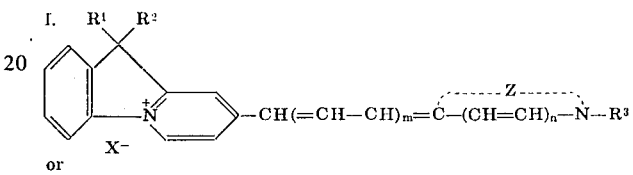

wherein:

R¹ and R² each represent an alkyl group having one to about six carbon atoms or together represent the atoms necessary to complete a cycloalkyl group having about five to 10 carbon atoms;

m and n each represent an integer having a value of 0 or 1;

R³ represents an alkyl group having one to about 10 carbon atoms, an alkenyl group having two to about 10 carbon atoms and a monocyclic, carbocyclic aryl group;

Z represents the non-metallic atoms necessary to complete a heterocyclic nucleus selected from the group consisting of a thiazole nucleus, a benzothiazole nucleus, a naphthathiazole nucleus, an oxazole nucleus, a benzoxazole nucleus, a naphthoxazole nucleus, a thiazoline nucleus, an imidazoquinoline nucleus, a benz[e]indole nucleus, a benzimidazole nucleus, a 3,3-dialkylindolenine nucleus, a 2-pyridine nucleus, a 4-pyridine nucleus and an imidazo[4,5-b]quinoxaline nucleus; and X⁻ represents an anion.

9. The method as described in claim 8 wherein Z represents the non-metallic atoms necessary to complete a benzoxazole nucleus.

10. The method as described in claim 8 wherein Z represents the non-metallic atoms necessary to complete a benzothiazole nucleus.

11. The method as described in claim 8 wherein Z represents the non-metallic atoms necessary to complete a 3,3-dialkylindolenine nucleus.

12. A method of producing coherent laser emission in the operation of a dye laser in the wavelength range of from about 500 to about 900 nm. comprising the step of optically pumping a dye solution to produce a population inversion in said solution and stimulate emission of radiation therefrom, said solution containing between about $10^{-2}$ to about $10^{-5}$ molar concentration of a lasing dye in a non-interfering solvent, said dye having the formula as follows:

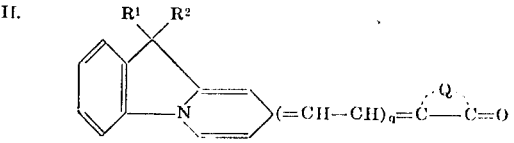

wherein:

R$^1$ and R$^2$ each represent an alkyl group having one to about six carbon atoms or together represent the atoms necessary to complete a cycloalkyl group having about five to 10 carbon atoms;

*q represents an integer having a value of* 1 or 2;

Q represents the non-metallic atoms necessary to complete a five- or six-membered cyclic nucleus selected from the group consisting of an isoxazolinone, an oxindole, a 2,4,6-triketohexahydropyimidine, a 2(3H)-imidazo[1,2-a]pyridone, a 5,7-dioxo-6,7-dihydro-5-thiazolo[3,2-a]pyrimidine, a 2-thio-2,4-oxazolidinedione, a thianaphthenone, a 2-thio-2,5-thiazolidinedione, a 2,4-thiazolidinedione, a thiazolidinone, a 4-thiazolinone, a 2-imino-2-oxazolin-4-one, a 2,4-imidazolidinedione, a 1,3-indanedione, a dione, a tetrone and a 2-imidazolin5-one nucleus.

13. The method as described in claim 12 wherein Q represents the non-metallic atoms necessary to complete a 2,4,6-triketohexahydropyrimidine nucleus.

14. The method as described in claim 12 wherein Q represents the non-metallic atoms necessary to complete a 4,6-diketo-2-thiocarbonylhexahydropyrimidine nucleus.

15. The method as described in claim 12 wherein Q represents the non-metallic atoms necessary to complete an oxindole nucleus.

16. The method as described in claim 12 wherein Q represents the non-metallic atoms necessary to complete a 1,3-indanedione nucleus.

* * * * *

PO-1050
(5/69)

UNITED STATES PATENT OFFICE
CERTIFICATE OF CORRECTION

Patent No. 3,860,886         Dated January 14, 1975

Inventor(s) Derek D. Chapman; William C. McColgin         Page 1 of 4

It is certified that error appears in the above-identified patent and that said Letters Patent are hereby corrected as shown below:

Column 4, line 2 insert -- to 10 carbon atoms such as cyclopentyl, cyclohexyl, etc;
  m and n each represent an integer having a value of 0 or 1;
  q represents an integer having a value of 1 or 2;
  $R^3$ represents an alkyl group having 1 to about 10 and preferably about 1 to about 4 carbon atoms and including substituted alkyl groups having such substituents as sulfo, carboxy, dialkylamino (having 1 to about 4 carbon atoms in the alkyl moieties), hydroxy, alkoxy (having 1 to about 4 carbon atoms in the alkyl moiety), acyloxy, alkoxycarbonyl (having 1 to about 4 carbon atoms in the alkyl moiety) and an aryl group having 6 to 20 carbon atoms; an alkenyl group having 2 to about 10 and preferably 2 to about 4 carbon atoms and including substituted alkenyl groups having such substituents as described above for the alkyl groups; and a monocyclic carbocyclic aryl group including substituted monocyclic aryl groups, e.g., phenyl, including substituted phenyl such as halophenyl, (chloro, bromo, etc), alkyl phenyl (having 1 to about 4 carbon atoms in the alkyl moiety) alkoxyphenyl (having 1 to about 4 carbon atoms in the alkyl moiety), hydroxyphenyl, etc;

UNITED STATES PATENT OFFICE
CERTIFICATE OF CORRECTION

Patent No. U. S. 3,860,886           Dated January 14, 1975

Inventor(s) Derek D. Chapman; William C. McColgin

It is certified that error appears in the above-identified patent and that said Letters Patent are hereby corrected as shown below:

Z represents the non-metallic atoms necessary to complete a heterocyclic nucleus containing from 5 to 6 atoms in the heterocyclic ring, such as those selected from the group consisting of a thiazole nucleus (e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc), a benzothiazole nucleus (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxy-

UNITED STATES PATENT OFFICE
CERTIFICATE OF CORRECTION

Patent No. U. S. 3,860,886          Dated January 14, 1975

Inventor(s) Derek D. Chapman; William C. McColgin          Page 3 of 4

It is certified that error appears in the above-identified patent and that said Letters Patent are hereby corrected as shown below:

benzothiazole, 5-ethoxybenzothiazole, tetrahydrobenzothiazole, 5,6-dimethoxybenzothiazole, 5,6-dimethylenebenzothiazole, 5-hydroxybenzothiazole, 6-hydroxybenzothiazole, etc), a naphthothiazole nucleus (e.g., naphtho[1,2-d]thiazole, naphtho[2,1-d]thiazole, naphtho[2,3-d]thiazole, 5-methoxynaphtho[2,1-d]thiazole, 7-methoxynaphtho[1,2-d]thiazole, 8-methoxynaphtho[1,2-d]thiazole, 7-methoxynaphtho[1,2-d]thiazole, etc), a thianaphtheno-7',6',4,5-thiazole nucleus (e.g., 4'-methoxythianaphtheno-7',6',4,5-thiazole, etc), an oxazole nucleus (e.g., 4-methyloxazole, 4-methyloxazole, 4-phenyloxazole, 4,5-diphenyloxazole, 4-ethyloxazole, 4,5-dimethyloxazole, 5-phenyloxazole, etc), a benzoxazole nucleus (e.g., benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc), a naphthoxazole nucleus (e.g., naphtho[1,2-d]oxazole, naphtho[2,1-d]oxazole, naphtho[2,3-d]oxazole, etc), a thiazoline nucleus (e.g., thiazoline, 4-methylthiazoline, etc), an imidazoquinoline nucleus (e.g., 1H-imidazo[4,5-b]quinoline, etc), a benz[e]indole nucleus (e.g., 1,1'dimethylben[e]indole, etc), a benzimidazole nucleus (e.g., 1,3- ---

UNITED STATES PATENT OFFICE
CERTIFICATE OF CORRECTION

Patent No. U. S. 3,860,886    Dated January 14, 1975

Inventor(s) Derek D. Chapman; William C. McColgin

It is certified that error appears in the above-identified patent and that said Letters Patent are hereby corrected as shown below:

Column 5, line 27 "hetero-cyclic" should read --- heterocyclic ---
Column 6, line 2 "1cthyl-3" should read --- 1-ethyl-3 ---
Column 8, line 26 insert ---except--- after "Example 1 is repeated"
Column 10, line 20 "4pyridine nucleus" should read --- 4-pyridine nucleus ---; line 45 "together" should read ---together---;
Column 10, line 66 "$10^{116}$ 1" should read --- $10^{-1}$ --- and "$10^{116}$ 6" should read --- $10^{-6}$ ---

Column 11, line 35 "$10^{116}$ 2" should read --- $10^{-2}$ ---; line 59 "1 and 2" should read -- 1 or 2 ---

Column 14, line 1 "imidazolin5-one nucleus" should read --- imidazoline-5-one nucleus ---

Signed and sealed this 8th day of April 1975.

(SEAL)
Attest:

RUTH C. MASON
Attesting Officer

C. MARSHALL DANN
Commissioner of Patents
and Trademarks